United States Patent [19]

Watanabe et al.

[11] Patent Number: 4,695,726
[45] Date of Patent: Sep. 22, 1987

[54] RADIATION IMAGE REPRODUCING METHOD AND APPARATUS

[75] Inventors: Hideo Watanabe; Nobuyoshi Nakajima, both of Kanagawa, Japan

[73] Assignee: Fuji Photo Film Co., Ltd., Kanagawa, Japan

[21] Appl. No.: 732,210

[22] Filed: May 9, 1985

[30] Foreign Application Priority Data

May 9, 1984 [JP] Japan .................................. 59-92628

[51] Int. Cl.$^4$ .............................................. G03C 5/16
[52] U.S. Cl. .................................................. 250/327.2
[58] Field of Search ........................... 250/327.2, 484.1

[56] References Cited

U.S. PATENT DOCUMENTS 4,564,861 1/1986 Hishinuma et al. .................. 378/162

Primary Examiner—Carolyn E. Fields
Attorney, Agent, or Firm—Sughrue, Mion, Zinn, Macpeak & Seas

[57] ABSTRACT

In the radiation image recording and reproducing system, a radiation image stored in a stimulable phosphor sheet at an n+1'th object image recording step is read out to obtain an electric image signal, and an electric image signal corresponding to radiation energy remaining in the stimulable phosphor sheet after an n'th image recording step is subtracted from the electric image signal obtained after the n+1'th image recording step. A visible image only of the radiation image recorded at the n+1'th image recording step is reproduced on the basis of an electric image signal obtained by the subtraction.

5 Claims, 1 Drawing Figure

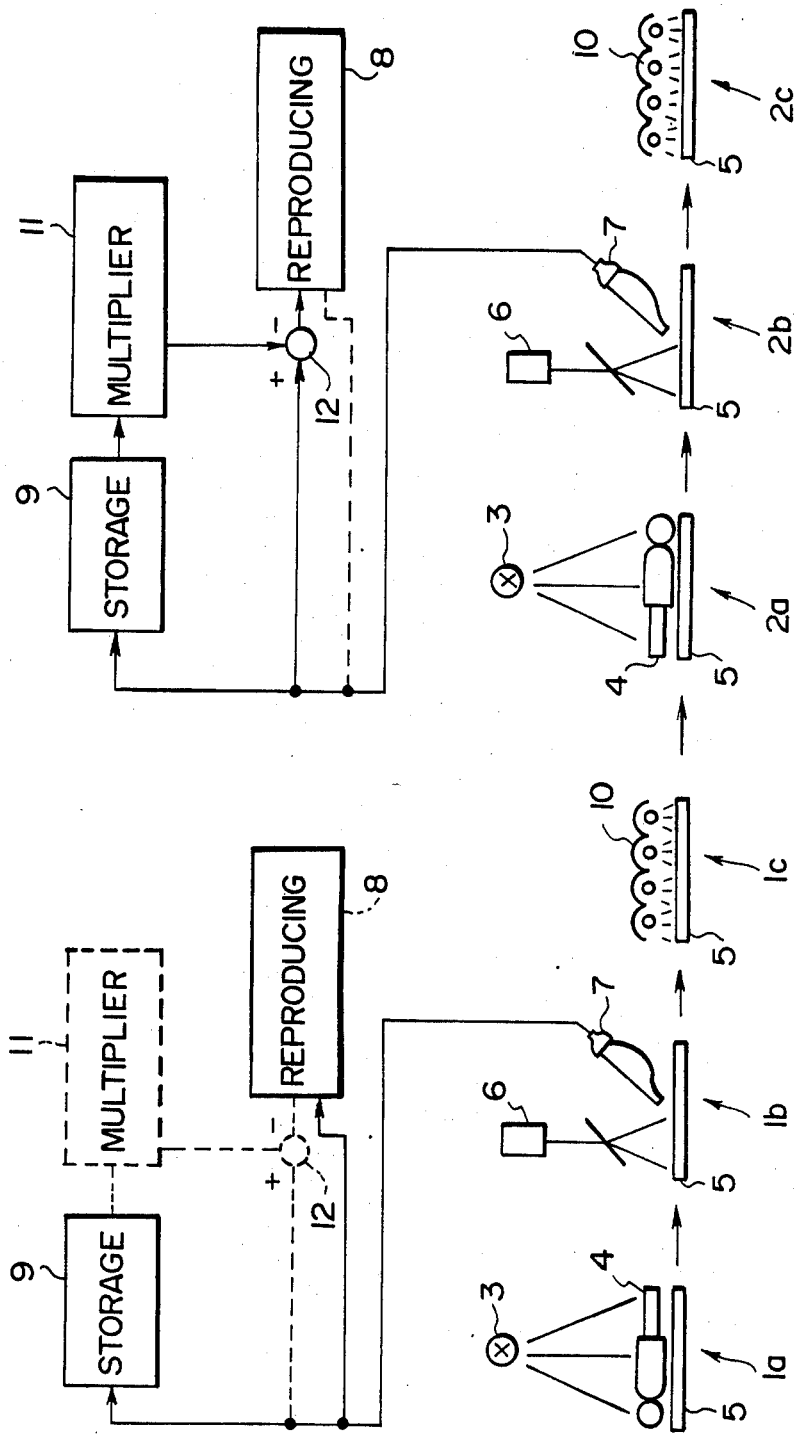

RADIATION IMAGE REPRODUCING METHOD AND APPARATUS

BACKGROUND OF THE INVENTION

1. Field of the Invention

This invention relates to a method of reproducing a radiation image in a radiation image recording and reproducing system using a stimulable phosphor sheet, and an apparatus for carrying out the method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

In the aforesaid radiation image recording and reproducing system, the stimulable phosphor sheet once used for recording a radiation image can be reused for further radiation image recording after radiation energy stored in the sheet is released, i.e. after the stored radiation image is erased.

Therefore, after the stored radiation image is read out by exposing the stimulable phosphor sheet to stimulating rays which cause the sheet to emit light in proportion to the stored radiation energy, radiation energy (radiation image) remaining in the sheet is released and erased by exposing the sheet to erasing light having at least light of a wavelength within the wavelength range of the stimulating rays obtained by a light source such as a fluorescent lamp, a tungsten-filament lamp, a sodium lamp, a xenon lamp or an iodine lamp. After erasing, the sheet is reused for radiation image recording.

However, in order to erase the radiation image remaining in the stimulable phosphor sheet after image read-out so that the remaining radiation image is not detected at the step of reading out a radiation image recorded next, it is necessary to expose the sheet to a large amount of erasing light, be keeping a large-capacity erasing light source turned on for long periods.

SUMMARY OF THE INVENTION

The primary object of the present invention is to provide a method of reproducing a radiation image in a radiation image recording and reproducing system wherein the amount of erasing light used for erasing radiation energy remaining in a stimulable phosphor sheet after image read-out is decreased.

Another object of the present invention is to provide a method of reproducing a radiation image, which is suitable particularly for a built-in type radiation image recording and reproducing system in which stimulable phosphor sheets are circulated in a housing to be repeatedly used for recording radiation images.

The specific object of the present invention is to provide an apparatus for carrying out the method.

The present invention provides a method of reproducing a radiation image in a radiation image recording is conducted by exposing a stimulable phosphor sheet to a radiation passing through an object to have a radiation image of the object stored in the stimulable phosphor sheet (This step will hereinbelow be referred to as "object image recording"), image read-out is conducted by scanning the stimulable phosphor sheet carrying the radiation image stored therein by stimulating rays which cause the stimulable phosphor sheet to emit light in proportion to the stored radiation energy and by photoelectrically detecting the emitted light to obtain an electric image signal, a visible image is reproduced by use of the electric image signal, the radiation image remaining in the stimulable phosphor sheet after the image read-out is erased, and the erased stimulable phosphor sheet is reused for the radiation image recording, the method of reproducing a radiation image comprising the steps of:

(i) reading out a radiation image stored in said stimulable phosphor sheet after n+1'th object image recording on the same stimulable phosphor sheet, thereby obtaining an electric image signal after the n+1'th object image recording, (ii) substracting an electric image signal corresponding to a remaining radiation image obtained after n'th image recording from said electric image signal after the n+1'th image recording, and (iii) reproducing a visible image only of a radiation image recorded by the n+1'th image recording on the basis of an electric image signal obtained by said subtraction.

The present invention also provides an apparatus for reproducing a radiation image, which comprises:

(a) a storage means for storing the electric image signal obtained by said step(i), (b) a multiplication means for multiplying said electric image signal stored in said storage means by a predetermined constant, (c) a substraction means for substracting an electric image signal obtained by multiplying an electric image signal stored in said storage means after n'th image recording on said stimulable phosphor sheet by said predetermined constant by said multiplication means from an electric image signal obtained by said image read-out conducted after n+1'th object image recording on the same stimulable phosphor sheet, and (d) a reproduction means for reproducing said visible image on the basis of an output image signal of said subtraction means.

In the present invention, n denotes an arbitrary natural number.

In short, the present invention is characterized by reproducing a visible image of a radiation image recorded at the n+1'th image recording step on the basis of an electric image signal obtained by subtracting the electric image signal corresponding to a radiation image remaining in the stimulable phosphor sheet obtained after previous (n'th) image recording from the electric image signal obtained by image read-out after the n+1'th image recording when the same stimulable phosphor sheet is repeatedly used for radiation image recording.

In the present invention, when the radiation image recorded at a previous image recording step is not erased and is involved in the electric image signal detected at the current image recording and read-out step, the electric image signal corresponding to the previous radiation image remaining in the stimulable phosphor sheet is substracted from the electric image signal detected at the current image recording and read-out step. A visible image is then reproduced by use of the electric image signal obtained by the subtraction. Therefore, it is possible to obtain a visible image free from noise caused by the previous radiation image remaining in the stimulable phosphor sheet.

Also, since the presence of the previous radiation image remaining in the stimulable phosphor sheet after erasure is allowable, erasing of the radiation image after image read-out may not be conducted completely, and it is possible to decrease the amount of erasing light.

Further, since the amount of erasing light can be decreased, it is possible to shorten the erasing time for which the erasing light source is turned on. Accordingly, when the present invention is applied to a built-in type radiation image recording and reproducing system wherein the stimulable phosphor sheets are circulated and reused in a housing (This type is referred to as "built-in type" in this specification.) proposed in Japanese Patent Application No. 58 (1983)-66730 wherein an image recording section, an image read-out section and an erasing section are connected by a path for conveying and circulating the stimulable phosphor sheets and the stimulable phosphor sheets are circulated and reused for image recording and read-out, it becomes possible to shorten the image recording and reproducing cycle and to realize high-speed image recording.

Also, in order to store all of the previous image signals detected from many stimulable phosphor sheets, an expensive storage unit of a large capacity is necessary. However, in the aforesaid built-in type radiation image recording and reproducing system, since it is not necessary to use so many stimulable phosphor sheets, a storage unit having a limited storage capacity may be used, and no problem arises with regard to the cost. Therefore, the method and apparatus of the present invention are applicable particularly advantageously to the built-in type radiation image recording and reproducing system.

BRIEF DESCRIPTION OF THE DRAWING

The single drawing is a schematic view showing an embodiment of the method and apparatus for reproducing a radiation image in accordance with the present invention.

DESCRIPTION OF THE PREFERRED EMBODIMENTS

The present invention will hereinbelow be described in further detail with reference to the accompanying drawing.

In the drawing, reference numerals 1a, 1b and 1c denote an image recording step, a read-out step and an erasing step in the first image recording and reproducing process. Reference numerals 2a, 2b and 2c denote an image recording step, a read-out step and an erasing step in the second image recording and reproducing process.

At the image recording step 1a in the first image recording and reproducing process, a stimulable phosphor sheet 5 is exposed to a radiation emitted by a radiation source 3 and passing through an object 4 to have a radiation image of the object 4 stored in the sheet 5.

The stimulable phosphor sheet 5 is then sent to the read-out step 1b at which the sheet 5 is scanned by stimulating rays such as a laser beam emitted by a stimulating ray source 6. Light emitted by the stimulable phosphor sheet 5 in proportion to the stored radiation energy when it is exposed to stimulating rays is photoelectrically detected by a photoelectric conversion means 7 to obtain an image signal. The image signal is stored in a storage means 9 and used for reproducing a visible image on a recording medium such as a photographic film or on a CRT by a reproduction means 8.

At the erasing step 1c, the stimulable phosphor sheet 5 is exposed to erasing light emitted by an erasing means 10 such as a fluorescent lamp, and the radiation image remaining in the sheet 5 is erased.

Then, the stimulable phosphor sheet 5 is sent to the second image recording step 2a at which a radiation image of a new object is stored in the sheet 5 in the same manner as the first image recording step 1a. At the second read-out step 2b, image read-out is conducted in the same manner as in the first read-out step 1b, and an electric image signal obtained is stored in the storage means 9. The second reproduction of a visible image is conducted by the reproduction means 8 in the same manner as in the first visible image reproduction by use of an electric image signal obtained by subtracting the stored first image signal multiplied by a factor $\alpha$ indicating the rate of the residual image with respect to the formerly recorded image after erasure (hereinafter referred to as "remaining image rate") determined by the first erasing conditions and characteristics of the stimulable phosphor constituting the stimulable phospor sheet 5 from the electric image signal obtained by the second read-out step 2b. At this time, the multiplication is conducted by a multiplication means 11 constituted by a multiplier or the like, and the substraction is conducted by a subtraction means 12 constituted by a subtracter or the like.

After the second read-out step 2b, the radiation image remaining in the stimulable phosphor sheet 5 is erased at the second erasing step 2c in the same manner as in the first erasing step 1c. Subsequently, image recording, read-out, reproduction and erasing are repeated in the same manner as in the second image recording and reproducing step.

In the subtraction between the image signals for the second and subsequent visible image productions, a signal of each picture element obtained by multiplying the previous stored image signal by the predetermined constant may be subtracted from the image signal of the corresponding picture element obtained by each of the second and subsequent read-out steps.

The subtracted signal, i.e. the signal corresponding to the unerased and remaining radiation image which is read-out at the second and subsequent read-out steps, may be calculated by any method other than the multiplication by the constant $\alpha$.

The remaining image rate in each erasing step may be adjusted to any value. However, when a radiation image recorded prior to the previous image remains in the stimulable phosphor sheet, the images are sequentially accumulated in the sheet. Therefore, the remaining image rate should preferably be adjusted so that only the radiation image recorded just before the current step remains in the stimulable phosphor sheet, i.e. so that an image is erased completely when the sheet is subject to the erasing steps twice.

Also, the image recording conditions such as the intensity of radiation at each image recording step and the read-out conditions such as the intensity of stimulating rays and the read-out gain at each read-out step should preferably be maintained the same. When these conditions change, the image signal to be subtracted or the constant $\alpha$ by which the image signal to be subtracted is multiplied must be adjusted in accordance with the degree of the change.

In the case where the stimulable phosphor sheet 5 is exposed to the radiation without making the radiation pass through the object 4 at the first image recording and reproducing step, the signal detected by the read-out from the sheet 5 represents nonuniformity caused by nonuniformity of sensitivity of the sheet 5 or of the read-out means. Therefore, it is possible to reproduce a visible image free from nonuniformity caused by the apparatus or the like by subtracting the signal representing nonuniformity caused by the apparatus or the like multiplied by a predetermined constant from the read-out electric image signal at the second image recording and reproducing step (i.e. the first image recording with the radiation passing through the object and the first reproduction of the object image), or by subtracting the signal representing the unerased and remaining radiation image and the signal representing the nonuniformity from the read-out electric image signal at the third and subsequent image recording and reproducing steps.

In the drawing, the image read-out means, the storage means, the reproduction means, the subtraction means and the erasing means are shown for each image recording and reproducing step. However, normally, since the stimulable phosphor sheets are circulated and reused, it is sufficient that a single combination of these means is installed.

We claim:

1. A method of reproducing a radiation image in a radiation image recording and reproducing system in which object image recording is conducted by exposing a stimulable phosphor sheet to a radiation passing through an object to have a radiation image of the object stored in the stimulable phosphor sheet, image read-out is conducted by scanning the stimulable phosphor sheet carrying the radiation image stored therein by stimulating rays which cause the stimulable phosphor sheet to emit light in proportion to the stored radiation energy and by photoelectically detecting the emitted light to obtain an electric image signal, a visible image is reproduced by use of the electric image signal, the radiation image remaining in the stimulable phosphor sheet after the image read-out is erased, and the erased stimulable phosphor sheet is reused for the radiation image recording, the method of reproducing a radiation image comprising the steps of:
(i) reading out a radiation image stored in said stimulable phosphor sheet after n+1'th object image recording on the same stimulable phosphor sheet, thereby obtaining an electric image signal after the n+1'th image recording,
(ii) subtracting an electric image signal corresponding to a remaining radiation image obtained after n'th image recording from said electric image signal after the n+1'th image recording, said electric image signal corresponding to said remaining radiation image being determined in accordance with recording and read-out conditions, in accordance with erasing conditions at erasing of an n'th recorded image, and further in accordance with a type of stimulable phosphor sheet employed, and
(iii) reproducing a visible image only of a radiation image recorded by the n+1'th image recording on the basis of an electric image signal obtained by said step(ii).

2. A method as defined in claim 1 wherein said electric image signal corresponding to a remaining radiation image is obtained by multiplying the radiation image obtained after the n'th image recording by a remaining image rate.

3. A method as defined in claim 1 or 2 wherein said erasing is conducted so that only the radiation image recorded by said n'th image recording remains in said stimulable phosphor sheet when said n+1'th image recording is conducted.

4. An apparatus for reproducing a radiation image in a radiation image recording and reproducing system in which object image according is conducted by exposing a stimulable phosphor sheet to a radiation passing through an object to have a radiation image of the object stored in the stimulable phosphor sheet, image read-out is conducted by scanning the stimulable phosphor sheet carrying the radiation image stored therein by stimulating rays which cause the stimulable phosphor sheet to emit light in proportion to the stored radiation energy and by photoelectrically detecting the emitted light to obtain an electric image signal, a visible image is reproduced by use of the electric image signal, the radiation image remaining in the stimulable phosphor sheet after the image read-out is erased, and the erased stimulable phosphor sheet is reused for the radiation image recording, the apparatus for reproducing a radiation image comprising:
(a) a storage means for storing the electric image signal obtained by said image read-out,
(b) a multiplication means for multiplying said electric image signal stored in said storage means by a predetermined constant, said predetermined constant being determined in accordance with recording and read-out conditions, in accordance with erasing conditions at erasing of an n'th recorded image, and further in accordance with a type of stimulable phosphor sheet used,
(c) a substraction means for subtracting an electric image signal obtained by multiplying an electric image signal stored in said storage means after n'th image recording on said stimulable phosphor sheet and multiplied by said predetermined constant by said multiplication means from an electric image signal obtained by said image read-out conducted after n+1'th object image recording on the same stimulable phosphor sheet, and
(d) a reproduction means for reproducing said visible image on the basis of an output image signal of said subtraction means.

5. An apparatus as defined in claim 4 wherein erasing means conducts erasing so that only the radiation image recorded by said n'th image recording remains in said stimulable phosphor sheet when said n+1'th image recording is conducted.

* * * * *